(12) United States Patent
Bender et al.

(10) Patent No.: US 7,469,402 B2
(45) Date of Patent: Dec. 23, 2008

(54) PLUGGABLE MODEL FRAMEWORK

(75) Inventors: Lothar H. Bender, Rauenberg (DE);
Raman Eraviputhur Vettri, Bangalore (IN); Joachim Bender, Weiheim (DE)

(73) Assignee: SAP Aktiengesellschaft, Walldorf (DE)

( * ) Notice: Subject to any disclaimer, the term of this patent is extended or adjusted under 35 U.S.C. 154(b) by 703 days.

(21) Appl. No.: 11/024,084

(22) Filed: Dec. 28, 2004

(65) Prior Publication Data

US 2006/0143592 A1 Jun. 29, 2006

(51) Int. Cl.
*G06F 9/44* (2006.01)
(52) U.S. Cl. .................. 717/121; 717/104; 717/106; 717/120
(58) Field of Classification Search .......... 717/103–109, 717/100, 120–121, 168–178; 705/6–9; 709/200, 709/220
See application file for complete search history.

(56) References Cited

U.S. PATENT DOCUMENTS

| | | | |
|---|---|---|---|
| 6,442,748 B1 * | 8/2002 | Bowman-Amuah | 717/108 |
| 6,536,037 B1 * | 3/2003 | Guheen et al. | 717/151 |
| 6,550,057 B1 * | 4/2003 | Bowman-Amuah | 717/126 |
| 6,601,234 B1 * | 7/2003 | Bowman-Amuah | 717/108 |
| 6,615,166 B1 * | 9/2003 | Guheen et al. | 703/27 |
| 7,047,518 B2 * | 5/2006 | Little et al. | 717/108 |

OTHER PUBLICATIONS

Adaptive Plug-andPlay Components for Evolutionary Software Development, Mira Mezini et al, ACM, 1998, pp. 97-116.*
Workflow Template Process Developing a WFT Workflow System, Template Software, Version 8.0, Second Edition, Whole Manual, 1998 (WFT).*
Workflow Template Process Using a WFT Development Environment, Template Software, Version 8.0, Second Edition, Whole Manual , 1998 (ENV).*
SNAP Foundation Template Using the SNAP Communication Component, Template Software, Version 8.0, Second Edition, Whole Manual , 1998 (COM).*
Wide Workflow Development Methodology, L. Baresi et al, ACM, Mar. 1999, pp. 19-28.*
SNAP Foundation Template Using the SNAP Permanent Storage Component, Template Software, Version 8.0, Second Edition, Whole Manual , 1998 (PERM).*
SNAP Foundation Template Using the SNAP Development Environment, Template Software, Version 8.0, Second Edition, Chapters 1-7 , 1998 (SNAP).*

\* cited by examiner

*Primary Examiner*—William H Wood
(74) *Attorney, Agent, or Firm*—Fish & Richardson P.C.

(57) ABSTRACT

A pluggable model framework in a model-view-controller (MVC) environment. The pluggable model framework contains elements that relate to one or more of a development tool for an application, a metamodel that defines development objects associated with the application, a generator for generating code based on the metamodel, and an application run-time. The pluggable model framework includes an extension point that corresponds to at least one of the elements. A plug-in interfaces to the pluggable model framework by way of the extension point. The plug-in corresponds to a model used by the application.

20 Claims, 8 Drawing Sheets

PLUGGABLE MODEL FRAMEWORK

TECHNICAL FIELD

The present invention relates generally to data processing by a digital computer and, more particularly, to programming frameworks.

BACKGROUND

The model-view-controller (MVC) architecture is a well-known architecture used by computer programs that contain user interfaces (UIs). In the MVC architecture, user input, modeling of the external world, and visual feedback to the user are separated and handled by view, model, and controller objects. The controller interprets mouse and keyboard inputs from the user and maps these user actions to commands that are sent to the model and/or view to effect appropriate changes. The model manages one or more data elements, responds to queries about its state, and responds to instructions to change state. The view manages an area of the display and is responsible for presenting data to the user through a combination of graphics and text.

SUMMARY

The invention provides methods and apparatus, including computer program products, for implementing a pluggable model framework in an application that has an MVC architecture.

In general, in one aspect, the invention features a computer program product that defines the pluggable model framework. The pluggable model framework includes elements that relate to one or more of a development tool for an application, a metamodel that defines development objects associated with the application, a generator for generating code based on the metamodel, and an application run-time. The pluggable model framework also includes an extension point that corresponds to at least one of the elements. A plug-in interfaces to the pluggable model framework by way of the extension point. The plug-in contains data for use by a model used by the application. The data is for interfacing to an external system.

By interfacing a plug-in to the pluggable model framework, this aspect of the invention enables model-specific functionality to be added to an existing set of supported model types used by an application. For example, a new model type may provide a model import wizard. This import wizard, and other functionality that is specific to the new model type, may be contained in a plug-in that could be installed in a development tool used with the application. After installation, the new model type would be visible in a list of supported model types. An application could thus select a new model importer at a point in time at which a new model is created in the application.

The foregoing aspect may also include one or more of the following. The pluggable model framework may include plural extension points, each of which corresponds to one of the elements. An extension point for each element in the pluggable model framework may be for a counterpart element in the plug-in. The application development tool may be an element to interface with an external system to determine requirements of the external system and thereby determine how to construct the model; an editor framework for editing the metamodel; a wizard framework for identifying a type of the model based on the plug-in and for invoking a wizard designed for the type of the model; an extension plug-in framework for monitoring the extension point and for providing information from the extension point to one or more of the elements; and/or a user interaction framework that handles activities relating to a user interface for the application.

In general, in another aspect, the invention features a system that includes a client that renders a view for an application, and a server that executes a model that interfaces to a back-end system and a controller that mediates between the view and the model. The model includes a pluggable model framework. The pluggable model framework includes extension points that interface to a plug-in that corresponds to the back-end system. This aspect may also include one or more of the following.

The pluggable model framework may include elements that relate to one or more of an application development tool, a metamodel that defines development objects associated with the application, a generator for generating code based on the metamodel, and an application run-time. Each of the elements may include at least one extension point that interfaces to a counterpart element of the plug-in. The application development tool may include one or more of the tools listed above under the first aspect.

The details of one or more examples are set forth in the accompanying drawings and the description below. Further features, aspects, and advantages of the invention will become apparent from the description, the drawings, and the claims.

DESCRIPTION OF THE DRAWINGS

Like reference numerals in different figures indicate like elements.

DETAILED DESCRIPTION

In an exemplary MVC-based application described herein, a view corresponds to software for representing the UI of an application, a model corresponds to software that interfaces to a back-end system containing data storage, and a controller corresponds to software that controls interactions and data transfer between a view and a model.

Figure 1:
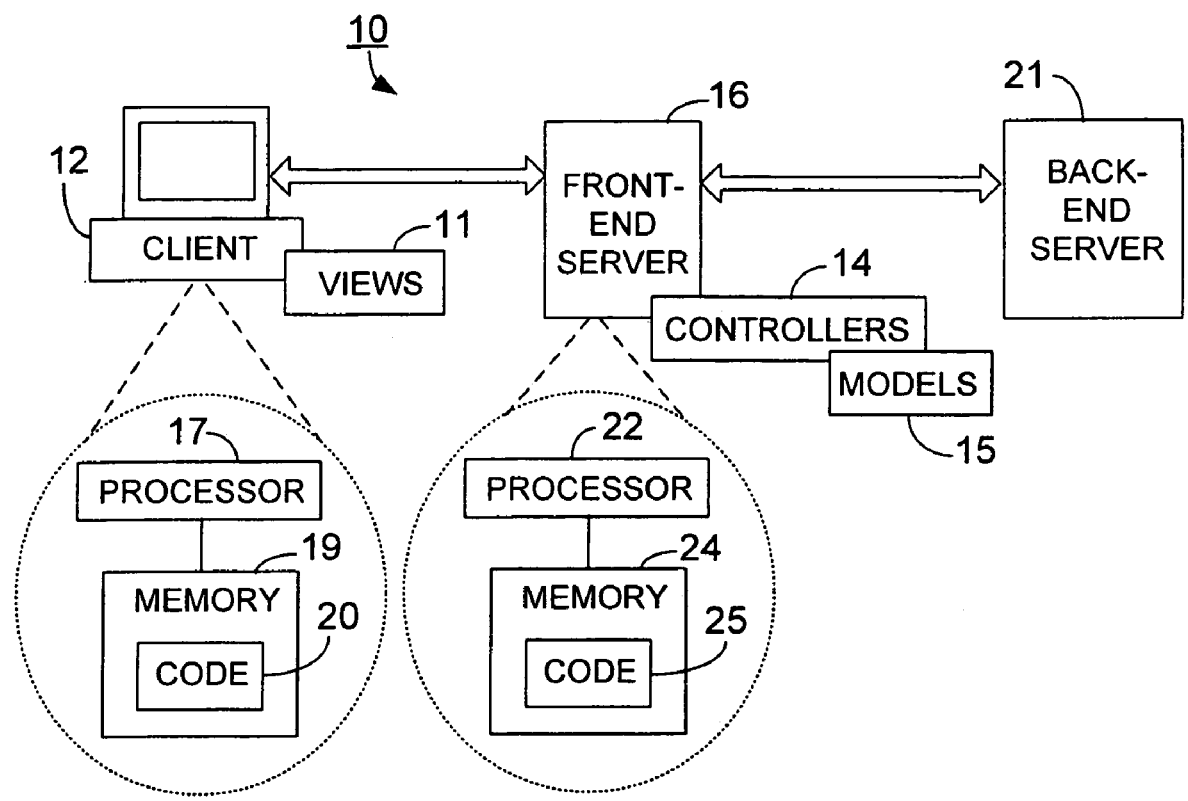
FIG. 1 is a block diagram of a network on which an MVC application is run.

FIG. 1 shows an example system 10 in which views 11 are rendered on client 12, while views 11, controllers 14 and models 15 are executed on front-end server 16. In this example, client 12 may be any type of computing device, such as a desktop computer, a mainframe, or the like, that is capable of receiving and presenting data for display, and of communicating with front-end server 16. Client 12 includes one or more processor(s) 17 and memory 19 that stores code 20 for rendering views 11 and associated elements. Front-end server 16 also may be any type of computing device that is capable of processing data, and of communicating with both client 12 and back-end system 21. As shown in FIG. 1, front-end server 16 may include one or more processors 22 and memory 24 that stores code 25 for implementing views 11, models 15, controllers 14, associated elements, and the pluggable model framework described herein. Back-end system 21 may be any type of data repository or computing device that is capable of providing data to front-end server 16 and/or of receiving data from front-end server 16. Client 12, back-end system 21, and front-end server 16 each may be implemented using more than one computing device, even though only one computing device for each is shown in FIG. 1.

For the sake of illustration, it will be assumed that the MVC-based application is implemented using Web Dynpro (a proprietary technology from SAP® AG of Walldorf, Germany), although other MVC-based frameworks may be used. In Web Dynpro a developer associates views to screen space and specifies the appearance of an end-user's screen by arranging basic UI elements within the views. Views are strung together with navigational links to define a possible sequence that the user will see. One aspect of a view is its layout. Generally, the layout constitutes an arrangement of controls. A control is an interactive UI element, such as input fields, buttons, selectable menu items, and checkboxes. Also contained within a view are a view controller and its associated view context. A view controller contains presentation logic that responds to user action, such as pressing a button or using a menu item. The view context is the local memory of the view controller. In Web Dynpro, views are generated on a server, but are rendered on a client. Different technologies for rendering might be supported, e.g., using a browser as rendering engine or smart clients that perform rendering based on an underlying operation system.

A controller (which is separate entity from a view controller) is software that acts as a mediator between a view and a model. The Web Dynpro application may contain more than one controller and one or more different types of controller. A controller implements one or more event handlers, which react to user actions. An event handler is code that executes when a user performs an action, such as pressing a button or using a menu item.

Thus, while views define what an end-user sees on-screen, a controller handles actions that are invoked from the screen, such as clicking a button and selecting data in a table, or passes the actions on to other controllers so that the other controllers can handle the actions. The controllers therefore constitute active entities in the user interface. The hierarchy of data that a controller owns is its context (described below). For data to automatically travel from one controller to the other, it is possible to assign mappings between the contexts of different controllers. For other relationships, bindings may be set to define automatic, bi-directional data flow between a part of a context and UI elements in a view's layout or a part of a model layer that encapsulates a back-end system.

A context is a local memory and the communicational part of a controller. Each controller has one associated context. This context contains and maintains state(s) specific to its corresponding controller during the controller's lifetime. Each context instance is directly bound to a controller instance. The context contains local data fields, and can establish relations to data defined within a model, or to the contexts of other controllers. The context is hierarchically structured, meaning that data within the context is organized as a data tree. Controllers communicate by context mapping, i.e., by providing other controllers with context data. Each context may also have associated attributes.

Figure 8:
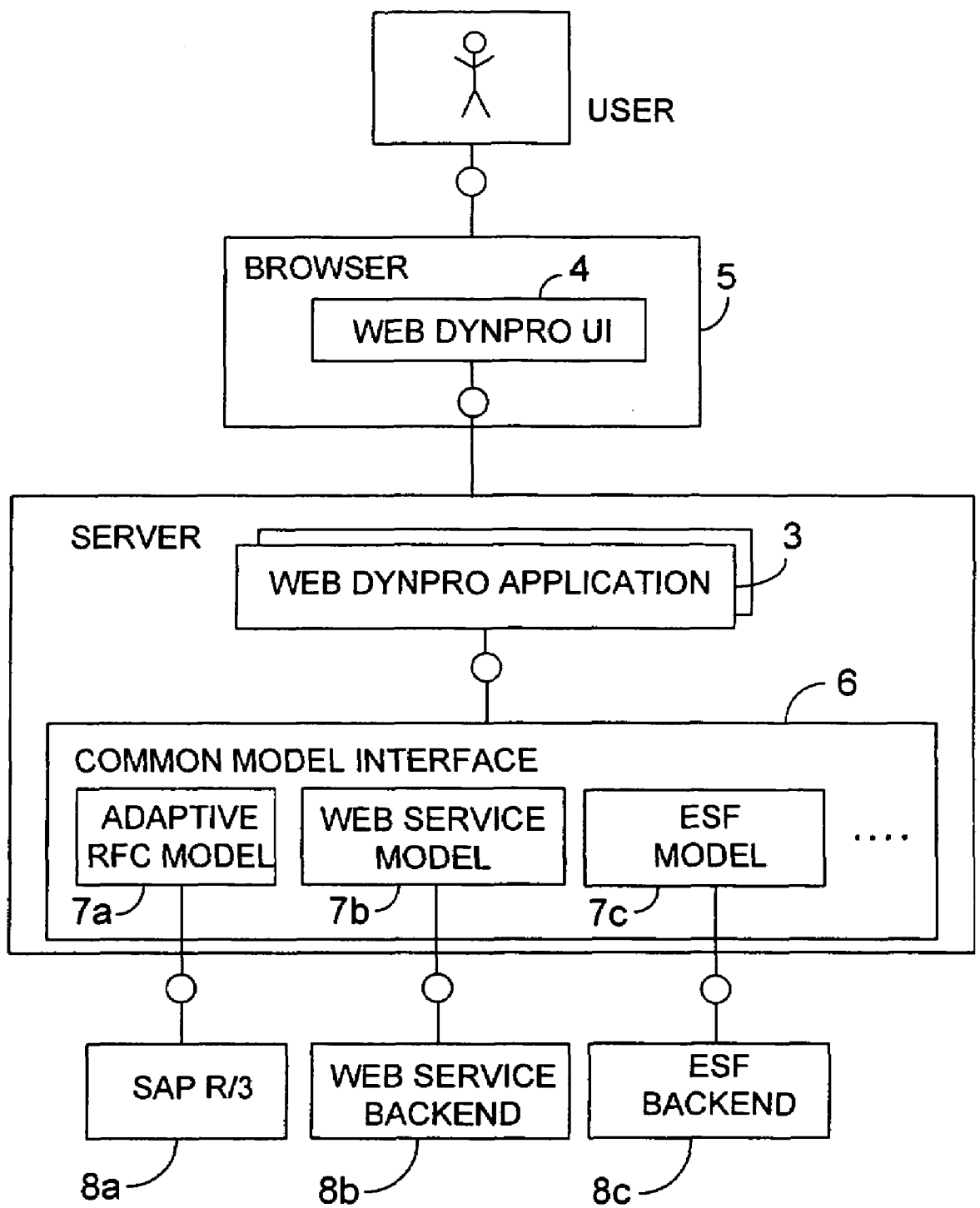
FIG. 8 shows the relationship between, a user, a Web Dynpro application, and back end systems.

A model is software that grants a framework access to a back-end system (e.g., data storage and/or business logic). The back-end system may reside, e.g., in an SAP® R/3 system. The model exposes business data and metadata through a common model interface (CMI) (defined below) to the framework that is on top of the CMI. That is, the model acts as a mediator between a controller in the Web Dynpro application and the back-end system to route data, commands, and/or other types of information between the controller and the back-end system. For example, as shown in FIG. 8, a Web Dynpro application 3 generates a UI 4, which is displayed to a user through a browser 5. The CMI 6 includes several models 7*a*, 7*b*, 7*c*, which interface application 3 to corresponding back-end systems 8*a*, 8*b*, 8*c*.

Generally, the Web Dynpro application is written in a multi-developer environment, in which all parts of the Web Dynpro application must access one or more commonly used models. These models can be relational models, such as a database schema; object models implemented on top of, e.g., Java data objects (JDOs); or adapters to a back-end system, such as an SAP® R/3 system, a customer relationship management (CRM) system, or Web services. The CMI provides the ability to bind Web Dynpro logic to each model in a way that is independent of the specific technology in the back-end system used for storing the data. Thus, the CMI acts as a layer of indirection between a framework like Web Dynpro that uses a model and a framework that implements a model.

During design-time, an application developer uses development tools to create and modify elements of a Web Dynpro application. Examples of tools that may be used include an importer, an editor and a reimporter. An importer and a reimporter interface with a back-end system to obtain requirements of the back-end system and, from those requirements, to determine how a model should be constructed. An editor provides a developer with the ability to edit a model that is generated in the Web Dynpro framework. Other tools may also be used to create and modify elements of a Web Dynpro application.

One advantage of Web Dynpro is that the application developer does not need to generate code to develop an application. Instead, the application developer constructs the application by a declarative programming model that uses metadata to define elements of the application. Thus, instead of writing code, the application developer uses available tools to declare development objects and relationships between the development objects. That is, the application developer creates development objects in a declarative way by using metadata rather than by writing code. The result of this declarative programming process is a metamodel that defines development objects for a Web Dynpro application. Examples of such development objects include controls (e.g., screen controls such as buttons and input fields), views (e.g., displays with layouts of UI elements), data bindings (e.g., bindings between UI elements and application data), and inbound and outbound plugs as start- and end-points for navigational links between views.

After development objects have been created, a generator uses the development objects to generate run-time objects (e.g., classes and source code) that can be deployed for use by an application. That is, the development objects are a declarative representation and, therefore, are not executable. The generator transforms those development objects into source code that can be compiled to execute the application. The generator can generate run-time objects using specific languages such as, for example, Java, eXtensible Markup Language (XML), and/or other platform-neutral, or platform-specific, source code. The generator typically is made up of one or more templates that can interpret metadata.

At run-time, the Web Dynpro framework invokes the model to interact with the back-end system, e.g., to retrieve data from, or to store data in, the back-end system.

Figure 2:
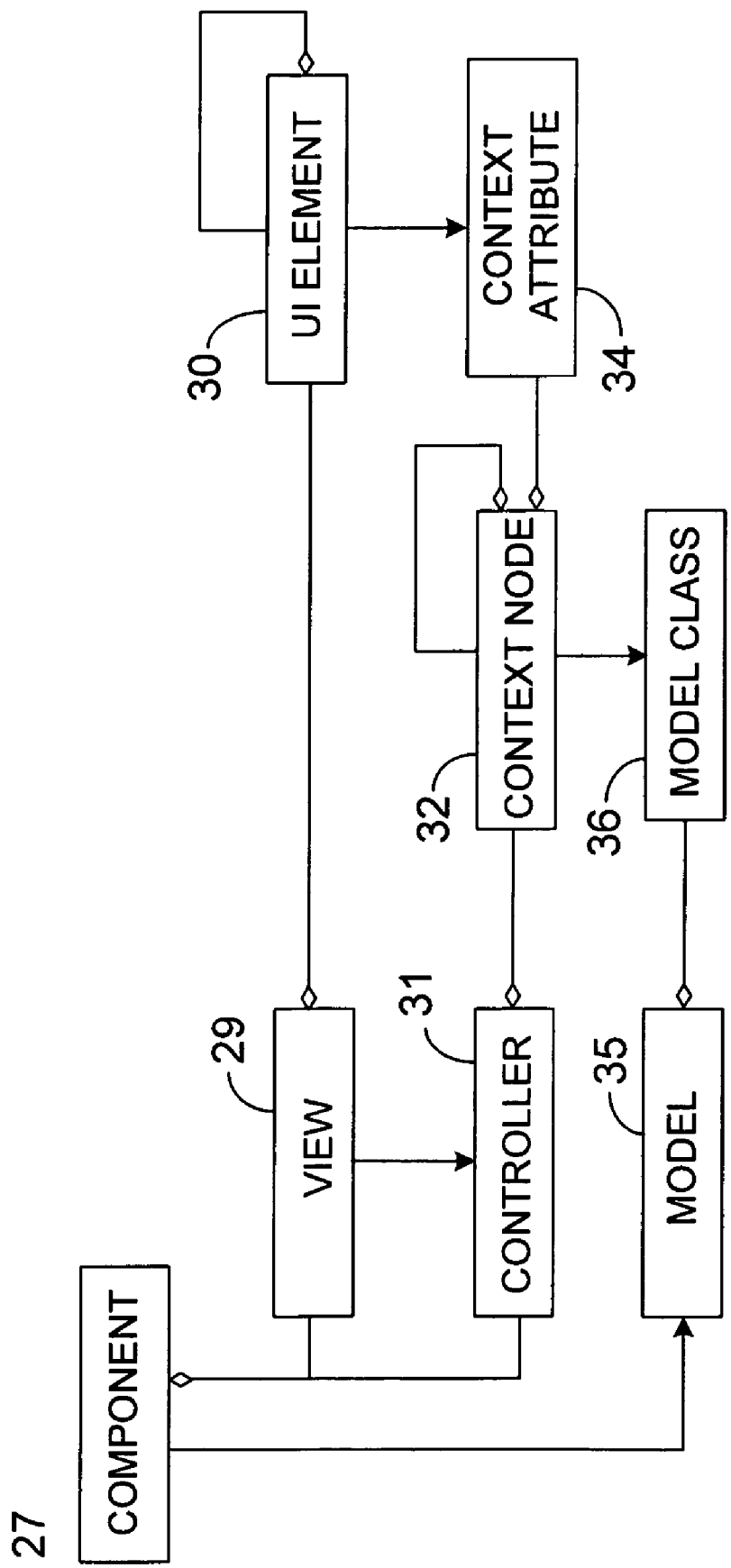
FIG. 2 is a block diagram that partly shows an underlying metamodel for model and controller objects.

As mentioned above, the Web Dynpro development process is based on a metamodel. FIG. 2 shows an exemplary metamodel 26, which is represented using a unified modeling language (UML) class diagram. As shown in FIG. 2, classes of metamodel 26 can include application components 27, views 29 with UI elements 30, controllers 31 with context nodes 32 and context attributes 34, and models 35 with model classes 36. Components 27 represent reusable entities that can be used to group various application elements (e.g., models, views, controllers, and contexts). Context node 32, which is associated with controller 31, provides a storage area for the data used by the controller 31, as well as methods for storing and accessing the data based on a declared data structure. Metamodel 26 also can include relationships between metamodel classes, as shown in FIG. 2. The UML class diagram of the metamodel 26 can be viewed, in essence, as a formal description of the programming model for a Web Dynpro application.

Figure 3:
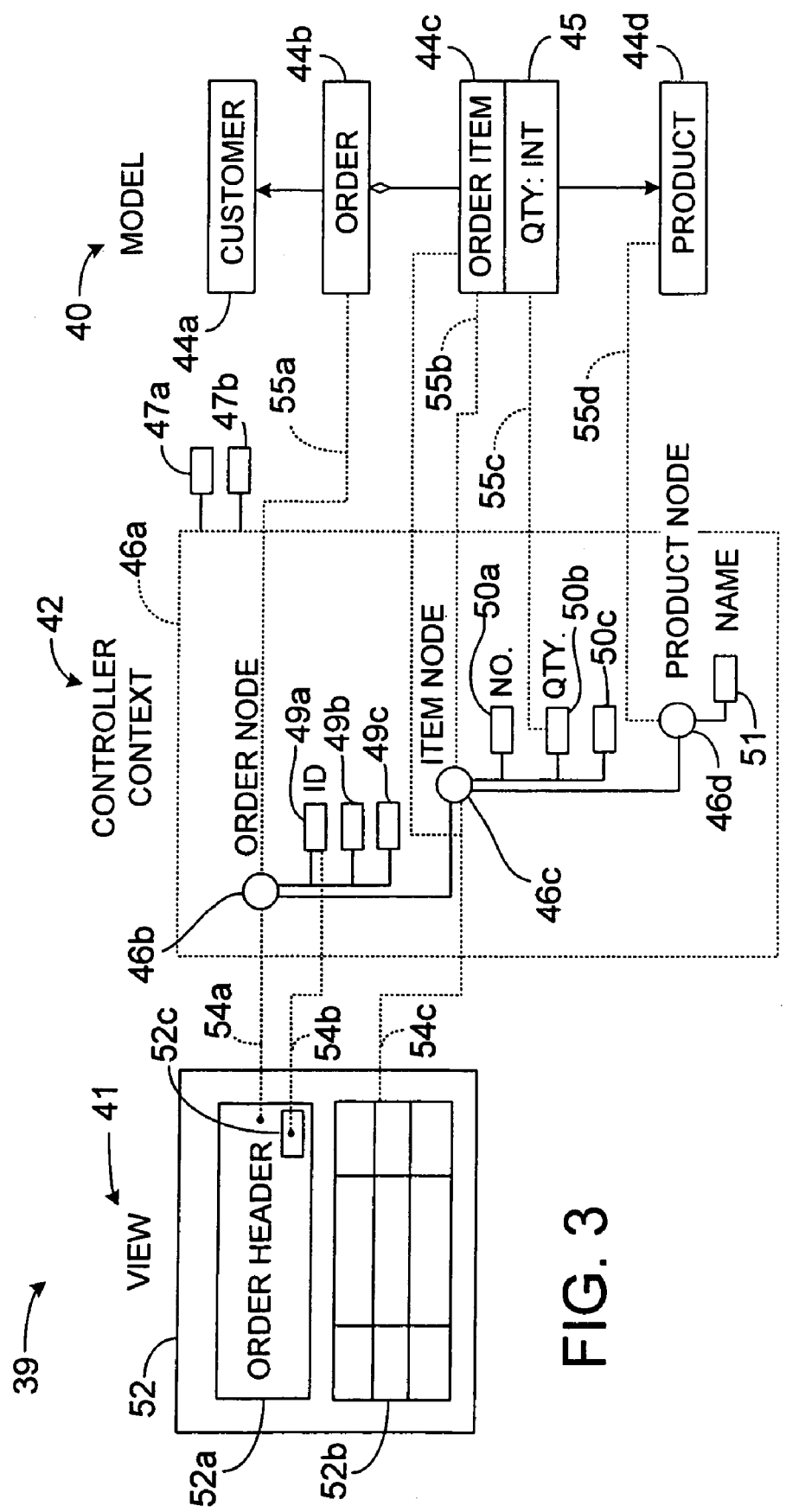
FIG. 3 is a block diagram that shows metadata that defines a concrete model and controller context.

To illustrate more clearly how a metamodel relates to a Web Dynpro application, FIG. 3 provides an example of a metamodel for a component instance 39 of a Web Dynpro application. Component instance 39 is associated with instances of a model 40, a view 41, and a controller 42. Model 40 represents a model of a business application that the Web Dynpro application represents. View 41 represents a UI layout that the application displays to a user. Controller 42 is the binding logic that associates view 41 to business application model 40. As illustrated, Web Dynpro application 39 constitutes an application to view and modify data associated with a customer order.

Model 40 includes model classes customer 44a, order 44b, order item 44c, and product 44d (generally model classes 44). Model classes 44 are illustrated in FIG. 3 using a UML representation. Model class 44c includes an attribute 45. Attribute 45 is labeled "Qty." and is an integer type. Controller 42 includes context nodes context 46a, order node 46b, item node 46c, and product node 46d (generally context nodes 46). Each context node 46 includes one or more context attributes. Context node 46 includes attributes 47a and 47b. Context node 46b includes attributes 49a (labeled "ID"), 49b, and 49c. Context node 46c includes attributes 50a (labeled "No."), 50b (labeled "Qty."), and 50c. Context node 46d includes attribute 51 (labeled "Name"). View 41 includes a display layout 52 that includes UI elements 52a, 52b, and 52c (UI elements 52).

Component 39 includes associations 54a to 54c, which represent data bindings between view 41 and controller 42. As illustrated, the data bindings are between UI elements and context nodes or context attributes. Component 39 also includes associations 55a to 55d, which represent data bindings between model 40 and controller 42. As illustrated, the data bindings are between model classes and context nodes, model relation roles and context node dependencies (e.g., parent-child relationship), or model class attributes and context attributes.

Originally, the Web Dynpro framework was configured for use with predefined native model types, such as RFC (remote function call) and Web services. That is, the Web Dynpro tools, generation templates, run-time support, and associated metamodels were tailored for use with the native model types. The Web Dynpro framework also supports pluggable models. That is, the Web Dynpro framework allows developers to use non-native model types, which may be defined by plug-ins. Generally speaking, a plug-in is software that adds additional functionality to an underlying application, in this case, to a Web Dynpro application, without requiring significant (or any) modification to code for the underlying application. Model-specific plug-ins can thus be integrated into a Web Dynpro application, thereby enabling the Web Dynpro application to communicate (by way of the plug-ins) with virtually any type of back-end system.

Figure 4:
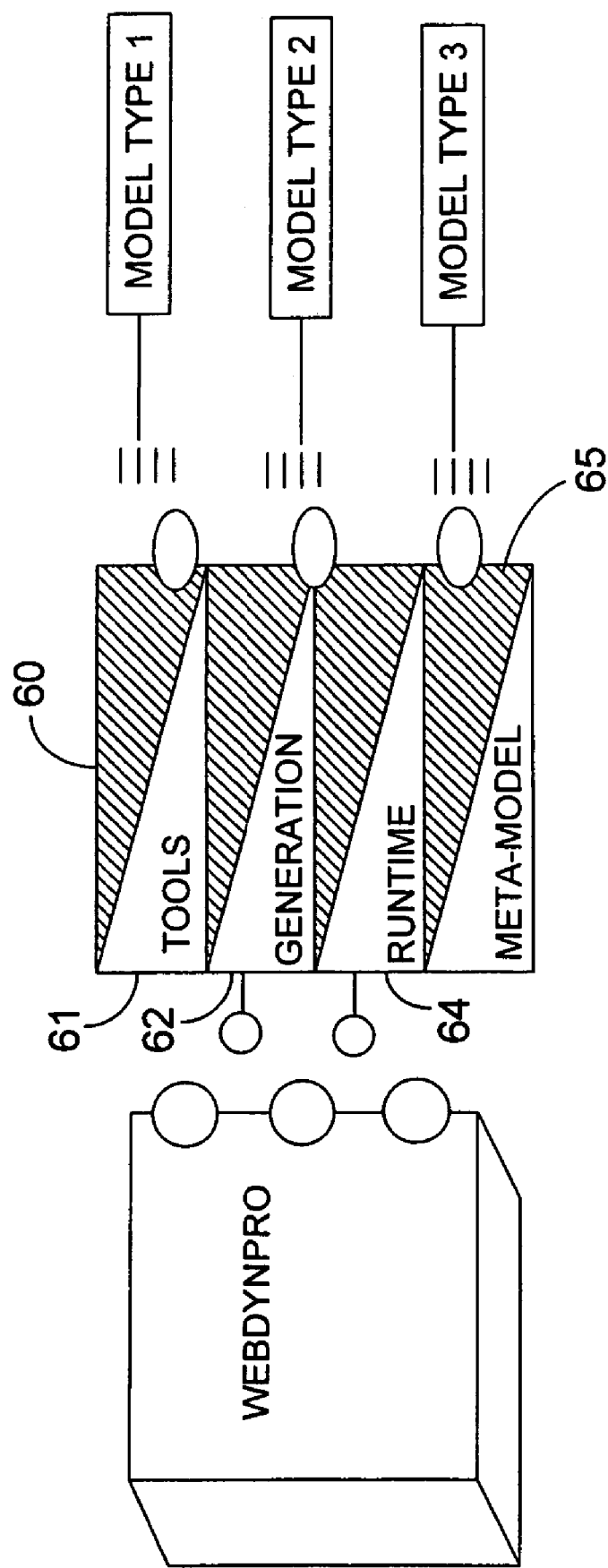
FIG. 4 is a block diagram depicting a pluggable model conceptually.

A model-specific plug-in 60 is depicted conceptually in FIG. 4. In model-specific plug-in 60, aspects of the model's tools 61, including editors, importers and the like, are defined; aspects of the model's generators (e.g., templates) 62 are defined; and aspects of the model's run-time functionality 64 are defined to make the model run-time pluggable. Metamodel information 65 that is specific to the model is also defined. Both new model types and native Web Dynpro models may be made pluggable in the same manner, enabling an application to treat all types of models the same manner (see also FIG. 7 below).

Figure 5:
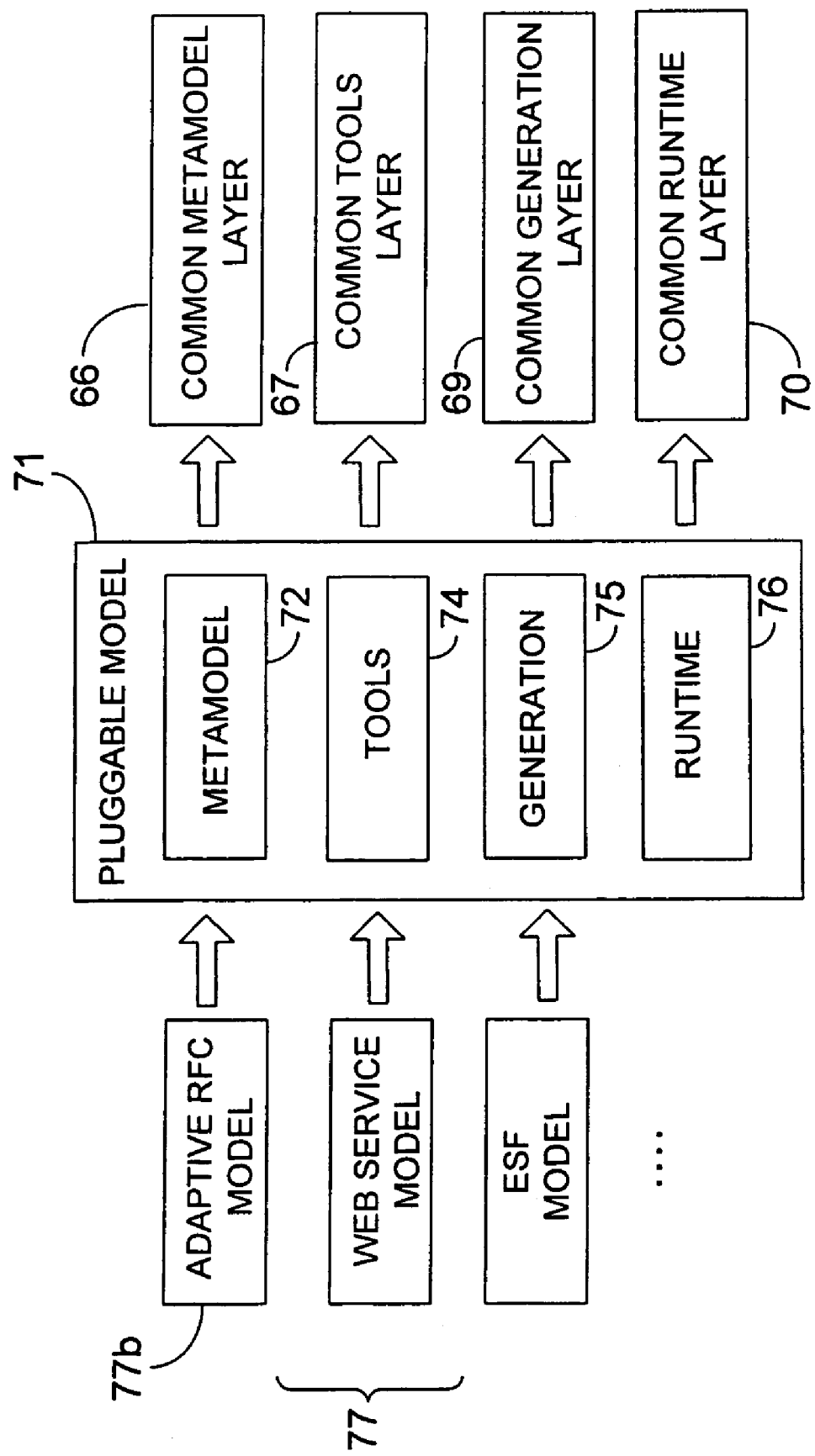
FIG. 5 is a block diagram showing model-specific plug-ins, a pluggable model framework, and common model layers.

Some generic functionality of models is built into common software layers in the Web Dynpro development framework. Referring to FIG. 5, these layers include a common metamodel layer 66, a common tools layer 67, a common generation layer 69, and a common run-time layer 70. These common software layers contain functionality that is generic to all (or substantially all) model types. For example, common metamodel layer 66 may contain dictionary definitions that are used for most model types; common tools layer 67 may contain generic editor and wizard functionality; and common generation layer 69 may contain generic Apache Ant task handling functionality. Likewise, common run-time layer 70 may contain generic functionality that relates to invoking models at run-time.

Figure 6:
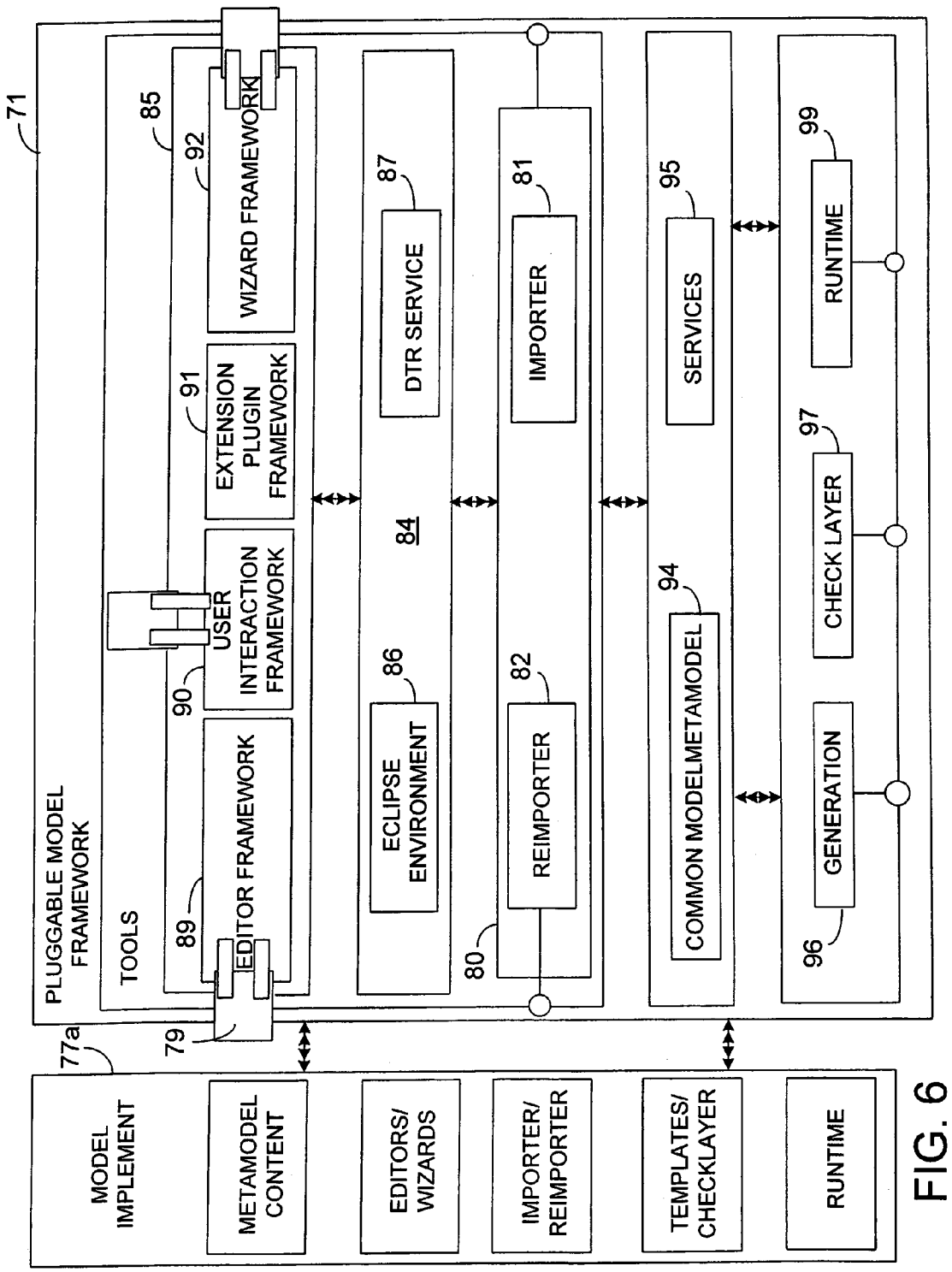
FIG. 6 is a block diagram showing elements of the pluggable model framework.

As shown in FIG. 5, pluggability is achieved by defining a pluggable model framework 71 that contains metamodel content 72, tools 74, a generation layer 75, and a run-time layer 76. Model-specific plug-ins 77 interface to pluggable model framework 71. In operation, pluggable model framework 71 interfaces to the common software layers and contains extension points (or simply, extensions) that interface to model-specific plug-ins. The extensions enable the model-specific plug-ins (e.g., plug-in 77b) to interface to pluggable model framework 71 and thereby become part of an underlying Web Dynpro application. FIG. 6 shows constituents of elements of pluggable model framework 71.

FIG. 6 distinguishes between two types of extensions that are used by pluggable model framework 71: Eclipse extensions 79 and interface extensions 80. Eclipse is an open source software development project that provides an industry platform for the development of integrated tools. Eclipse extensions can be used for parts of pluggable model framework 71 that are only running within an integrated development environment (IDE) used to develop an application using the Web Dynpro framework. Extensions that are needed in other environments, such as central build server (CBS) or a command line interface, are defined at the interface level.

Figure 7:
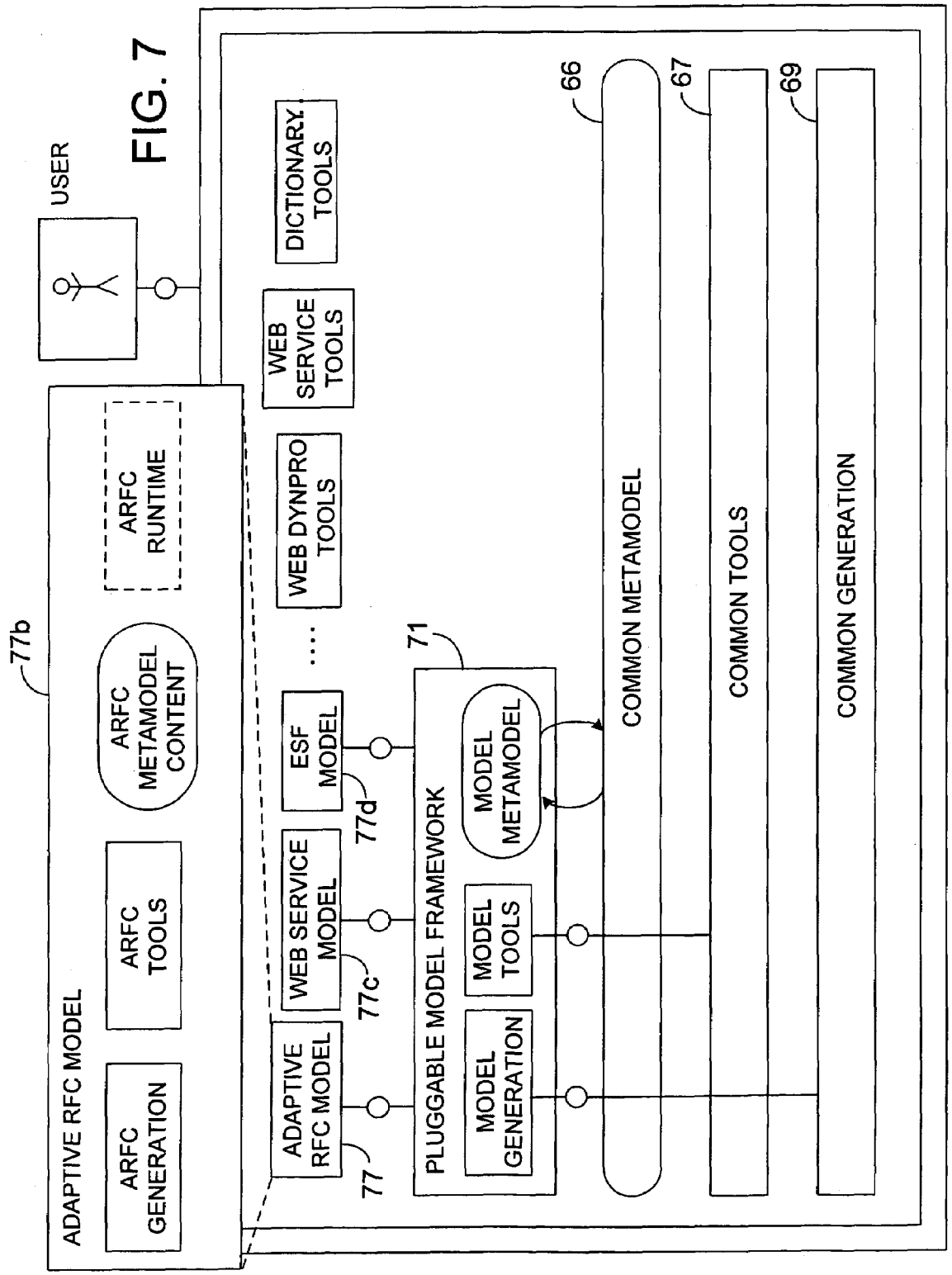
FIG. 7 is a block diagram showing relationships between the model-specific plug-ins, the pluggable model framework, and the common model layers.

FIG. 7 shows IDE aspects of the pluggable model framework. In particular, FIG. 7 depicts relationships between pluggable model framework 71, common software layers 66, 67 and 69 (run-time is not shown), and model-specific plug-ins 77. As shown in FIG. 7, pluggable model framework 71 provides the extensions, through which model plug-ins 77 interface to pluggable model framework 71. Each plug-in, such as plug-in 77c or 77d contains elements that correspond to elements of pluggable model framework 71. That is, the plug-in contains a generation layer, tools, metamodel content, and a run-time layer. These elements interface to their counterparts on pluggable model framework 71 by way of the extensions on pluggable model framework 71. The elements augment the more general functionality of pluggable model framework 71 with functionality that is specific to a model type.

Referring back to FIG. 6, the tools of pluggable model framework 71 include importer 81 and reimporter 82, Eclipse interaction layer 84, and UI pluggable model framework 85. Importer 81 contains extension(s) to different model-specific plug-ins, which enable import functionality in response to user input. In one embodiment, each model-specific plug-in implements wizards that handle all importing functions. For example, wizards may be used to implement functions such as updating a progress monitor, or rolling back, committing, and updating a Web browser. Much of the functionality that is common to various types of importers can be abstracted out and provided as a service by importer 81. The reimporter functionality can also be made generic so that an importer can also abstract out core reimport functionality and provide that functionality as a service.

Eclipse interaction layer 84 includes Eclipse environment 86 and data transfer (DTR) service 87. Eclipse interaction layer 84 is the part of pluggable model framework 71 that hosts editors, wizards, and the like. However, from a conceptual point of view, this layer acts like an interface to the Eclipse environment. Thus, Eclipse environment 86 contains Eclipse-specific functionality, such as handling of progress monitor, and Java development tool (JDT) related interactions, such as deletion of proxies. DTR services 87 include functionality to identify objects that need to be checked out for a particular operation, checking-out objects in response to user input, and the like.

UI pluggable model framework 85 contains most of the tools-related functionality for pluggable model framework 71. UI pluggable model framework 85 contains extensions through which model-specific plug-ins can implement predefined functionality. The various extensions allow different levels of pluggability in order to ease integration of new model types and to allow as much flexibility as possible. For example, a model-specific plug-in may decide whether to provide its own set of editors or wizards, or to customize a generic set of editors and wizards provided by pluggable model framework 71.

UI pluggable model framework 85 includes editor framework 89, user interaction framework 90, extension plug-in framework 91, and wizard framework 92. Editor framework 89 is responsible for implementing editors for objects defined in a model metamodel. Editor framework 89 provides default editors for such objects, which may be used in connection with model-specific plug-ins. However, model-specific plug-ins can substitute model-specific editors for the default editors. User interaction framework 90 handles predefined UI-related activities, such as displaying information, and responding to menus, tool bar clicks, and the like. Extension plug-in framework 91 monitors all extension points and provides information from those extension points to appropriate elements. Wizard framework 92 is responsible for implementing creation wizards. That is, wizard framework 92 identifies available model types (from their plug-ins) and, when a user chooses a particular model type, invokes the wizard defined for that model type.

As shown in FIG. 6, pluggable model framework 71 also contains a common model metamodel 94. The common model metamodel decouples information associated with a model from the Web Dynpro metamodel. In contrast to the common metamodel (see FIG. 5) which contains common definitions for all metamodels, in this embodiment, the model metamodel contains only model-related definitions needed by the CMI.

Model settings are implemented by services 95. Model settings enable model-specific plug-ins to store additional, model-type-specific metadata. Each model-specific plug-in can define a specific set of model setting definitions, e.g., the Adaptive RFC model uses a model class setting in order to distinguish executable from non-executable model classes. A model setting definition can also reference a model type in order to define further constraints for a particular model setting.

In pluggable model framework 71, generator layer (i.e., generator) 96 defines generation outputs (e.g., files) for a model and its associated model classes. Generator 96 uses generation templates (as opposed to velocity templates) to generate run-time code from the common model metamodel and metamodel content provided in a model-specific plug-in. The model generation core relies on model setting(s) to determine whether to perform generation. Generic check layer 97 is a set of services that ensure consistency of metadata for a particular model definition. For example, generic check layer 97 may confirm that a metamodel relation has two ends pointing to model classes. Generic check layer 97 can be extended by model type specific checks.

The run-time part 99 of pluggable model framework 71 supports interfaces and services provided by the CMI. Run-time part 99 also includes a mechanism for storing data in a run-time repository. A category called run-time repository can be assigned to all model-setting definitions that are accessible to a model at run-time. A repository generator may analyze the categories of each setting and generate a corresponding entry in the repository for settings belonging to the run-time repository category. Other functions may also be performed by run-time part 99, such as invoking a model, or a portion thereof, to access a back-end system.

The pluggable model framework is not limited to the foregoing elements. The pluggable model framework may be modified, as necessary, depending upon the requirements of the underlying application. For example, the pluggable model framework may be used with applications other than Web Dynpro applications that have the MVC architecture. In such cases, the pluggable model framework would be adapted to the specifics of such an application. For example, the pluggable model framework could contain elements and extensions that are different than those described above. The base functionality, however, would remain the same. That is, the pluggable model framework defines extensions to which plug-ins could interface to and thereby become part of the underlying application.

The pluggable model framework is not limited to use with the hardware and software described above; it may find applicability in any computing or processing environment and with any type of machine that is capable of running machine-readable instructions. The pluggable model framework can be implemented in digital electronic circuitry, or in computer hardware, firmware, software, or in combinations thereof.

The pluggable model framework can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps associated with implementing the pluggable model framework can be performed by one or more programmable processors executing one or more computer programs to perform the functions of the pluggable model framework. The method steps can also be performed by, and the pluggable model framework can be implemented as, special purpose logic circuitry, e.g., an FPGA (field programmable gate array) and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer include a processor for executing instructions and one or more memory devices for storing instructions and data. Generally, a computer will also include, or be operatively coupled to receive data from, or transfer data to, or both, one or more mass storage devices for storing data, e.g., magnetic, magneto-optical disks, or optical disks. Information carriers suitable for embodying computer program instructions and data include all forms of non-volatile memory, including by way of example, semiconductor memory devices, e.g., EPROM, EEPROM, and flash memory devices; magnetic disks, e.g., internal hard disks or removable disks; magneto-optical disks; and CD-ROM and DVD-ROM disks.

The pluggable model framework can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the pluggable model framework, or any combination of such back-end, middleware, or front-end components. The components of the system can be interconnected by any form or medium of digital data communication, e.g., a communication network. Examples of communication networks include a LAN and a WAN, e.g., the Internet.

Method steps associated with implementing the pluggable model framework can be rearranged and/or one or more such steps can be omitted to achieve the same results described herein. The pluggable model framework can be used with any framework that generates Web- and UI-based applications and, in particular, with any application framework that uses the MVC architecture or a substantial equivalent thereof.

Elements of different embodiments described herein may be combined to form other embodiments not specifically set forth above. Other embodiments not specifically described herein are also within the scope of the following claims.

What is claimed is:

1. A computer program product for implementing a pluggable model framework for an application that has a model-view-controller (MVC) architecture, the computer program product being tangibly embodied in a computer-readable storage medium, the computer program product comprising instructions to cause a computer to:
    define the pluggable model framework, the pluggable model framework comprising a development tool for the application, a metamodel that defines development objects associated with the application, a generator for generating code based on the metamodel, and an application run-time component;
    the development tool, the metamodel, the generator, and the application run-time component each for interfacing to a corresponding software layer of the application, the pluggable model framework defining plural extension points for interfacing to corresponding plug-ins; and
    interface a plug-in to the pluggable model framework through at least one of the extension points, the plug-in containing data for use by the application, the data for interfacing to an external system.

2. The computer program product of claim 1, wherein each of the extension points corresponds to a specific plug-in.

3. The computer program product of claim 1, wherein the development tool comprises an element to interface with the external system to determine requirements of the external system.

4. The computer program product of claim 1, wherein the development tool comprises an editor framework for editing the metamodel.

5. The computer program product of claim 1, wherein the development tool comprises a wizard framework for identifying a type of the model based on the plug-in and for invoking a wizard designed for the type of the model.

6. The computer program product of claim 1, wherein the development tool comprises an extension plug-in framework for monitoring an extension point and for providing information from the extension point to one or more elements of the pluggable model framework.

7. The computer program product of claim 1, wherein the development tool comprises a user interaction framework that handles activities relating to a user interface for the application.

8. The computer program product of claim 1, wherein the development tool comprises at least one of:
    an editor framework for editing the metamodel;
    a wizard framework for identifying a type of the model based on the plug-in and for invoking a wizard designed for the type of the model; and
    an extension plug-in framework for monitoring an extension point and for providing information from the extension point to one or more elements of the pluggable model framework.

9. A system comprising:
    a client including a processor for rendering a view for an application; and
    a server for executing a model that interfaces to a back-end system and a controller that mediates between the view and the model;
    wherein the model comprises a pluggable model framework, the pluggable model framework comprising plural extension points that interface to a plug-in that corresponds to the back-end system, and wherein the pluggable model framework comprises:
        a development tool for the application, a metamodel that defines development objects associated with the application, a generator for generating code based on the metamodel, and an application run-time component;
        the development tool, the metamodel, the generator, and the application run-time component each for interfacing to a corresponding software layer of the application, the pluggable model framework defining the plural extension points for interfacing to corresponding plug-ins; and
        wherein a plug-in interfaces to the pluggable model framework through at least one of the extension points, the plug-in containing data for use by the application.

10. The system of claim 9, wherein each extension point clement of the is specific to a particular plug-in.

11. The system of claim 9, wherein the development tool comprises an element to interface with the back-end system to determine requirements of the back-end system.

12. The system of claim 9, wherein the development tool comprises an editor framework for editing the metamodel.

13. The system of claim 9, wherein the development tool comprises a wizard framework for identifying a type of the model based on the plug-in and for invoking a wizard designed for the type of the model.

14. The system of claim 9, wherein the development tool comprises an extension plug-in framework for monitoring an extension point and for providing information from the extension point to one or more elements of the pluggable model framework.

15. The system of claim 9, wherein the development tool comprises a user interaction framework that handles activities relating to a user interface for the application.

16. The system of claim 9, wherein the development tool comprises functionality for transferring data to and from the back-end system.

17. The system of claim 9, wherein the model further comprises generic model functionality that is common to plural types of models.

18. A method of implementing a pluggable model framework in an application that has a model-view-controller (MVC) architecture, the method comprising:

define the pluggable model framework, the pluggable model framework comprising a development tool for the application, a metamodel that defines development objects associated with the application, a generator for generating code based on the metamodel, and an application run-time component;

the development tool, the metamodel, the generator, and the application run-time component each for interfacing to a corresponding software layer of the application, the pluggable model framework defining plural extension points for interfacing to corresponding plug-ins; and interface a plug-in to the pluggable model framework through at least one of the extension points, the plug-in containing data for use by the application, the data for interfacing to an external system.

19. The method of claim 18, The computer program product of claim 1, wherein each of the extension points corresponds to a specific plug-in.

20. The method of claim 18, wherein the development tool comprises an element to interface with the external system to determine requirements of the external system.

* * * * *